(12) United States Patent
Sar et al.

(10) Patent No.: US 9,183,039 B2
(45) Date of Patent: Nov. 10, 2015

(54) ASSOCIATING A TASK COMPLETION STEP OF A TASK WITH A RELATED TASK OF THE SAME GROUP OF SIMILAR TASKS

(71) Applicant: Google Inc., Mountain View, CA (US)

(72) Inventors: Erwin Can Sar, Mountain View, CA (US); Timothy Youngjin Sohn, Mountain View, CA (US); Andrew Tomkins, Menlo Park, CA (US)

(73) Assignee: GOOGLE INC., Mountain View, CA (US)

( * ) Notice: Subject to any disclaimer, the term of this patent is extended or adjusted under 35 U.S.C. 154(b) by 127 days.

(21) Appl. No.: 14/090,716

(22) Filed: Nov. 26, 2013

(65) Prior Publication Data

US 2015/0150014 A1    May 28, 2015

(51) Int. Cl.
G06F 9/46 (2006.01)
G06F 9/48 (2006.01)
G06F 17/30 (2006.01)

(52) U.S. Cl.
CPC *G06F 9/46* (2013.01); *G06F 9/466* (2013.01); *G06F 9/48* (2013.01); *G06F 17/30* (2013.01)

(58) Field of Classification Search
None
See application file for complete search history.

(56) References Cited

U.S. PATENT DOCUMENTS

| | | | |
|---|---|---|---|
| 5,603,054 A | 2/1997 | Theimer et al. | |
| 6,842,877 B2 | 1/2005 | Robarts et al. | |
| 7,496,500 B2 | 2/2009 | Reed et al. | |
| 7,660,820 B2 * | 2/2010 | Alexander et al. | 718/100 |
| 8,055,707 B2 | 11/2011 | Desai et al. | |
| 8,108,206 B2 | 1/2012 | Hufnagel et al. | |
| 8,364,467 B1 | 1/2013 | Bowman et al. | |
| 8,375,099 B2 | 2/2013 | Carroll et al. | |
| 8,417,650 B2 | 4/2013 | Graepel et al. | |
| 8,521,818 B2 | 8/2013 | McGann et al. | |
| 8,560,487 B2 | 10/2013 | Jhoney et al. | |
| 8,599,801 B2 | 12/2013 | Baio et al. | |
| 2003/0061266 A1 * | 3/2003 | Ouchi | 709/106 |
| 2003/0083936 A1 | 5/2003 | Mueller et al. | |
| 2003/0217089 A1 * | 11/2003 | Bakow et al. | 709/100 |
| 2006/0224432 A1 * | 10/2006 | Li | 705/9 |
| 2007/0245261 A1 | 10/2007 | Bukovec et al. | |
| 2009/0113432 A1 * | 4/2009 | Singh et al. | 718/102 |

(Continued)

OTHER PUBLICATIONS

Corston-Oliver, Simon et al, "Task-Focused Summarization of Email," Microsoft Research Jul. 2004, (http://www1.cs.columbia.edu/~lokesh/pdfs/Corston.pdf), 8 pages.

(Continued)

*Primary Examiner* — Emerson Puente
*Assistant Examiner* — Benjamin Wu
(74) *Attorney, Agent, or Firm* — Middleton Reutlinger (57) ABSTRACT

Methods and apparatus related to associating a task completion step with one or more tasks. A task group is determined based on similarity between the tasks of the task group, a task completion step of one of the tasks of the task group is identified, and one or more of the other tasks of the task group are associated with the task completion step. In some implementations, the task group is determined based on similarity between entities that are associated with the tasks of the task group. In some implementations, the task group is determined based on textual representations that are associated with the tasks of the task group.

24 Claims, 5 Drawing Sheets

(56) References Cited

U.S. PATENT DOCUMENTS

| | | |
|---|---|---|
| 2009/0307212 A1 | 12/2009 | Ramot et al. |
| 2012/0150532 A1 | 6/2012 | Mirowski et al. |
| 2012/0239761 A1 | 9/2012 | Linner et al. |
| 2012/0317499 A1 | 12/2012 | Shen |
| 2012/0331036 A1 | 12/2012 | Duan et al. |
| 2013/0073662 A1 | 3/2013 | Meunier et al. |
| 2013/0159270 A1 | 6/2013 | Urmy et al. |
| 2013/0297551 A1 | 11/2013 | Smith et al. |

OTHER PUBLICATIONS

Laclavik, et al., "Email Analysis and Information Extraction for Enterprise Benefit," Institute of Informatics, Slovak Academy of Sciences, Slovakia, Computing and Informatics, vol. 30, 2011, pp. 57-87.

International Search Report and Written Opinion of PCT Serial No. PCT/US14/67733 Aug. 12, 2015.

\* cited by examiner

ASSOCIATING A TASK COMPLETION STEP OF A TASK WITH A RELATED TASK OF THE SAME GROUP OF SIMILAR TASKS

BACKGROUND

A user may have interest in creating one or more tasks and the user may utilize one or more applications to create the tasks. A task may be created that includes one or more task completion steps that may be performed to complete the task.

SUMMARY

This specification is directed to methods and apparatus related to determining one or more task completion steps for a given task. Some implementations of the specification are generally directed to determining similarity between two or more tasks and associating a task completion step of at least one of the tasks to at least one similar task that has not been associated with the task completion step. Tasks that share similar characteristics may share common and/or similar task completion steps. Similarity between tasks may be determined, for example, based on similarity between one or more terms and/or entities that are associated with the tasks.

In some implementations, a method is provided and includes the steps of: identifying a plurality of tasks, wherein one or more of the tasks are identified from one or more databases; determining a task group of the tasks based on similarity between tasks of the task group; determining an associated task of the tasks of the task group, wherein the associated task is associated with a task completion step; identifying an unassociated task of the task group based on the unassociated task being non-associated with the task completion step of the associated task; associating the task completion step of the associated task with the unassociated task; and storing the association between the unassociated task and the task completion step.

This method and other implementations of technology disclosed herein may each optionally include one or more of the following features.

Similarity between the tasks of the task group may be determined based on a task similarity measurement between the associated task and the other tasks of the task group. Similarity between the tasks of the task group may be determined based on determining a template similarity measurement for each of the tasks of the task group, and the template similarity measurement for a given task may be based on conformity between the given task and a task template. Each of the tasks may include a task objective.

In some implementations, a given task objective may include a task action and a task object. In some of those implementations, the similarity measurement for a given task of the tasks may be based on an action similarity measurement between the task action of the given task and the task action of one or more other tasks of the task group. The similarity measurement for a given task of the tasks may be based on an object similarity measurement between the task object of the given task and the task object of one or more other tasks of the task group. In some of those implementations, each of the task objectives of the tasks may include a textual representation of the task objective, and the similarity measurement for a given task of the tasks may be based on similarity between the textual representation of the given task and the textual representation of one or more of the other tasks of the task group.

In some implementations, the method may further include the steps of: identifying a second associated task of the tasks of the task group, the second associated task associated with a second task completion step, and the second associated task is unique from the associated task; and determining a task completion step similarity measurement, the task completion step similarity measurement indicative of similarity between the associated task completion step and the second associated task completion step, and the similarity of the second associated task with the tasks of the task group based on the task completion step similarity measurement. The task completion step may include a first completion action and a first completion object, and the second task completion step may include a second completion action and a second completion object.

The step of determining the task completion step similarity measurement may include determining a similarity between the first completion action and the second completion action. The step of determining the task completion step similarity measurement may include determining a similarity between the first completion object and the second completion object.

The unassociated task may be received from a remote computing device. The method may further include the step of providing the task completion step to the remote computing device as a suggested completion step for the unassociated task.

Other implementations may include a non-transitory computer readable storage medium storing instructions executable by a processor to perform a method such as one or more of the methods described herein. Yet another implementation may include a system including memory and one or more processors operable to execute instructions, stored in the memory, to perform a method such as one or more of the methods described herein.

Particular implementations of the subject matter described herein create an association between a task completion step with a given task based on calculated similarity between the given task and at least one similar task that is already associated with the task completion step. Particular implementations of the subject matter described herein may determine similarity measurements between the tasks that take into account one or more features of the tasks. The new association between the tasks may be utilized, for example, to provide the task completion step as a suggested completion step for an associated task via a remote computing device.

It should be appreciated that all combinations of the foregoing concepts and additional concepts discussed in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

A user may have interest in performing a task and may utilize one or more applications to create the task and/or determine how to complete the task. A task may be determined for a user based on information that is associated with the user and/or one or more actions of the user. User actions may include, for example, submitting one or more terms to an application that is executing on a computing device, executing a voice command, opening an application, and/or submitting one or more instructions. For example, a user may submit a search query of "pay my cell phone bill" to a search engine to request results that include a mailing address and/or a bill payment phone number for the cellular phone provider of the user. The user action of submitting a search query to a search engine may identify that the user has interest in creating a task based on the terms of the search query. As another example, a user may create an entry in a calendar application to remind the user of a future task to perform.

A task includes a task objective that specifies the intended result of a task. For example, a task for a user may be to pay a cellular phone bill and the result when the task is completed is that the cellular phone bill of the user is paid. A task may include one or more task completion steps that may be provided to a user to facilitate the task objective. For example, the task objective of a task of a user may be to pay a cellular phone bill and the user may be provided with a task completion step for the task that includes information that may be utilized to pay the cellular phone bill, such as a phone number and/or bill payment website of the user's cellular phone company. Task objectives and/or task completion steps may include one or more components. For example, task objectives may be represented by a task action and one or more task objects as described herein. Also, for example, a task completion step may be represented by a completion action and one or more completion objects as described herein.

A task objective includes a task action that the user has interest in performing. For example, a user may submit a search query of "pay cellular phone bill" and a task may be created that includes the task action "pay." Also, for example, a created task of "contact Bob" may include the task action "contact." In some implementations, a task action may be determined based on one or more sources in addition to the user actions that were utilized to create the task. For example, a task action may not be explicitly provided by a user, determinable based on the additional information that is associated with the user, and/or determinable based on actions of the user. For example, a user may submit a search query of "cell phone billing address," and a task may be determined with a task action of "pay" based on a determined likelihood that a search that includes "cell phone" and "address" may indicate that a user is searching for an address that is related to a cellular phone and that the user is interested in paying the cellular phone bill. One or more databases may be utilized to identify relationships between input from a user and likely actions to associate with a task. For example, a task database and/or an entity database may be utilized to determine task actions for a task based on associations in the database and/or available information that is associated with the user.

A task objective may include one or more task objects that are related to the task and/or the task action. For example, a task to pay a cellular phone bill may include the task object of "cellular phone bill," where "cellular phone bill" is the object to which the task action, "pay," is related. Also, for example, a task of "contact Bob" may include the task object that the user has interest in contacting: the person "Bob." In some implementations, an object of a task objective may not be a physical entity. For example, a task objective may be "attend meeting," where the task object is "meeting." In some implementations, a task action may be determined based on the task object that is determined for a task. For example, a task that includes a task object that is a phone number may be associated with the task action of "call" based on an association between an entity associated with the action "call" and an entity associated with "phone numbers" that is identified from one or more databases, such as an entity database.

In some implementations, a task may be associated with one or more task completion steps that may be performed to complete the task. For example, for a task of "pay my cellular phone bill," the user may be provided with a billing phone number, mailing address, and/or a webpage that the user may utilize to complete the task of paying a cellular phone bill. Also, for example, a task objective of "buy bananas" may be associated with task completion steps that specify actions that may be performed to complete a banana purchase, such as directions to a grocery store and/or a webpage address where produce may be purchased. In some implementations, a user may be provided with determined task completion steps for a task. For example, a user may be provided, via a mobile device of the user, with directions to a location where the task may be completed. In some implementations, task completion steps for a task may be provided to one or more users in addition to or instead of the user. For example, task completion steps may be provided to a human-based task fulfillment application, such as a website where one or more users may offer to complete a task for a user.

A task completion step may include a completion action and one or more completion objects. For example, for the task completion step of "travel to the grocery store," the task completion step may be associated with the completion action of "travel" and the completion object "grocery store." In some implementations, the completion action and/or the completion object of a task completion step may be determined based on one or more terms in a task objective, additional information that is associated with the user that is related to the task, and/or one or more sources of information, such as a task database and/or an entity database. For example, a task action of "contact" may be associated with a completion action of "call" based on determining that an entity with an alias of "contact" is associated with an entity with an alias of "call." Also, for example, a task with a task object of "dad" may be associated with a task completion step that includes a completion object of "Bob" based on determining that an entry in a contacts application of the user indicates that Bob is the father of the user. In some implementations, a task completion step may include a textual representation of a task completion step, a completion action, and/or a completion object.

A task may be associated with multiple task completion steps that may be performed and that each separately allows a user to satisfy the intended objective of the task by a different completion action and/or completion object. For example, the task of "pay cellular phone bill" may be completed by paying the bill through an online payment service, by mailing payment to a payment address, and/or through a phone payment transaction. The task objective of "pay cellular phone bill" may be associated with task completion steps for mailing a payment, for paying by phone, and/or for paying via an online payment based on determining that the task may be accomplished by any of these methods. In some implementations, different task completion steps for a task may be provided to a user based on one or more factors, such as a time and/or a place where the task may be completed. For example, a user may be provided with a mailing address for a bill when the bill payment will likely be received before the bill due date if the payment is mailed; whereas the user may be provided with an online payment service (and not the mailing address) when the bill payment will not likely be received before the due date if the bill was mailed. Also, for example, different task completion steps may be provided to a user based on the device and/or application that is being utilized by the user. For example, a user may be provided with a bill payment website when the user is identified as utilizing a web browser application of a computing device; whereas a dialing application executing on a mobile device of the user may be populated with the billing phone number when the user is identified as accessing the dialing application of a mobile device.

In some implementations, a task may include one or more times when a task may be completed and/or locations where a task may be completed. For example, a task may be "pay cellular phone bill" and a due date of the cellular phone bill may be identified based on additional information that may be identified from, for example, emails, user webpage navigation, a calendar application of the user, and/or one or more query terms that were submitted by the user. A date and/or time that are associated with a task may be utilized to determine when to provide task completion steps to a user and/or determine which task completion steps to provide to the user if multiple task completion steps are associated with the task. For example, a user may be provided with a task completion step that is related to mailing a payment for a bill when the due date is one week from the current date (i.e., when the payment will likely reach the cellular phone company by the due date). Also, for example, a user may be provided with a task completion step the day before a bill is due (i.e., when other forms of payment, such as mailing a payment, may not reach the cellular phone company by the due date) that includes calling a billing phone number and/or navigating to a web page where payment may be immediately submitted. In some implementations, one or more task completion steps may be provided to a user based on one or more actions of a user. For example, a task of "Call Bob" may be associated with a user and the user may be provided with a reminder to "Call Bob" when the user accesses a cellular phone.

In some implementations, one or more components of a task may be associated with a textual representation. For example, a task for paying a cellular phone bill may be associated with the textual representation "pay cellular phone bill" for the task objective, "pay" for the task action, and/or "cellular phone bill" for the task object. In some implementations, one or more of the textual representations that are associated with components of a task may be determined based on one or more terms and/or actions that were utilized to initially determine the task. For example, a user may submit a search query of "pay my cellular phone bill" and the textual representation of task objective for the determined task may be "pay cellular phone bill."

In some implementations, textual representations that are associated with a task may be a modified form of what was utilized to determine the task. Modification of textual representations may include, for example, replacing a term with a canonical form, reordering of terms, replacing terms with synonyms, and/or correcting misspellings. For example, the task that is determined based on the user submitting the query "calling phone company" may be associated with the textual representation "call phone company" and/or the task action for the task may be associated with the textual representation "call" based on replacing "calling" with a canonical form of "call." In some implementations, one or more stop words ("to," "for," "at," etc.) may be removed from textual representations. For example, a user may submit the query "pay the cell phone bill" and the textual representation that is associated with the determined task may be "pay cell phone bill."

Two or more tasks that share similarities may share similar task completion steps. For example, a task of "buy bananas" and a task of "buy apples" may both have a task completion step that includes a location where both bananas and apples may be purchased, such as a grocery store. Both tasks may be associated with a task completion step of "go to the grocery store." In some instances, a given task may not be associated with a task completion step and a similar task that has known task completion steps may be utilized to determine task completion steps for the given task based on similarity between the given task and the similar task. For example, a task of "buy bananas" may be associated with a task completion step of "go to the grocery store," but a task of "buy rhubarb" may not have associated task completion steps (e.g., a user has not previously submitted a task of purchasing rhubarb); however, based on similarities between the tasks "buy bananas" and "buy rhubarb" (i.e., both include buying produce), the task completion step of "go to the grocery store" may be associated with the task "buy rhubarb." Also, for example, "buy apples" may be associated with both "go to the grocery store" and "go to the farmer's market," and "buy bananas" may be associated only with the task completion step of "go to the grocery store." An association between the "buy bananas" task objective and the task completion step of "go to the farmer's market" may be determined based on: similarities between the task objectives "buy apples" and "buy bananas;" similarities between textual representations of one or more components of the tasks, such as the task actions and/or the task objects of the tasks; and/or similarities between the task completion steps of the tasks. Also, for example, the task completion step of "go to the farmer's market" may not be associated with the task "buy bananas" based on, for example, determining that bananas are not an item that is likely available at a local farmer's market.

Figure 1:
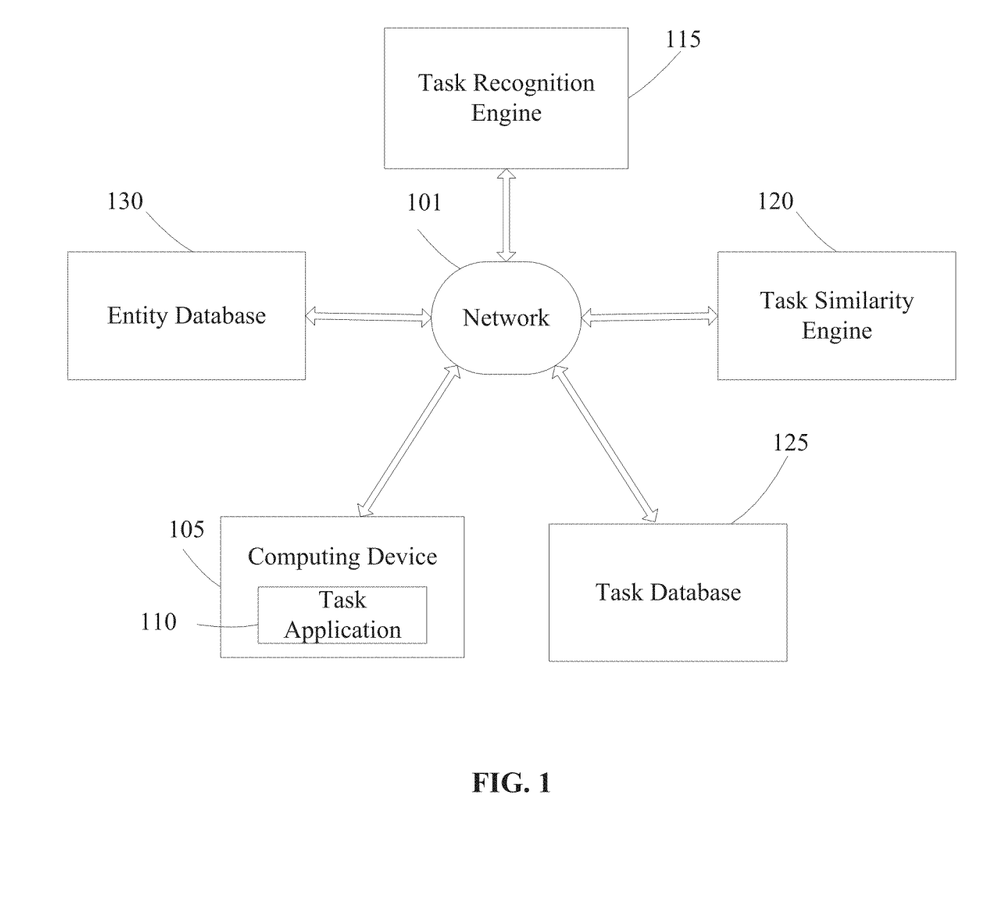
FIG. 1 is a block diagram of example environment in which a method for associating a task completion step of a task with a similar task may be implemented.

Referring to FIG. 1, a block diagram is illustrated of an example environment in which a method of associating a task completion step of a task with a similar task may be implemented. The environment includes computing device 105 with task application 110, task recognition engine 115, task similarity engine 120, task database 125, and entity database 130. The environment also includes a communication network 101 that enables communication between various components of the environment. In some implementations, the communication network 101 may include the Internet, one or more intranets, and/or one or more bus subsystems. The communication network 101 may optionally utilize one or more standard communications technologies, protocols, and/or inter-process communication techniques.

Figure 4:
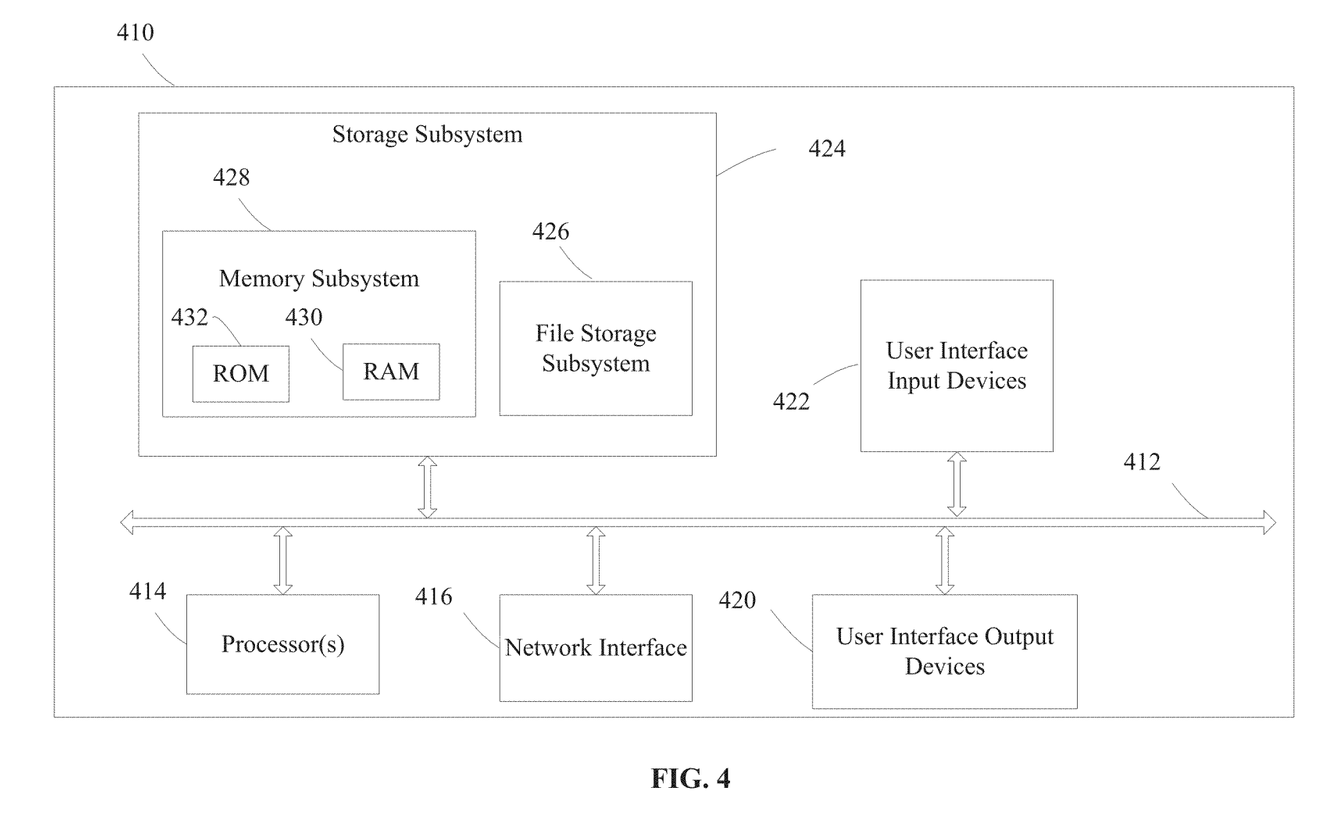
FIG. 4 illustrates a block diagram of an example computer system.

The task recognition engine 115, the task similarity engine 120, and/or one or more additional components of the example environment of FIG. 1 may each include memory for storage of data and software applications, a processor for accessing data and executing applications, and components that facilitate communication over a network. In some implementations, the task recognition engine 115 and/or the task similarity engine 120 may include hardware that shares one or more characteristics with the example computer system that is illustrated in FIG. 4. The operations performed by other components of the example environment may be distributed across multiple computer systems. For example, task recognition engine 115, task similarity engine 120, task database 125, and/or entity database 130 may be computer programs running on one or more computers in one or more locations that are coupled to each other through a network.

The computing device 105 executes one or more applications and may be, for example, a desktop computer, a laptop computer, a cellular phone, a smartphone, a personal digital assistant (PDA), a tablet computer, a navigation system, a wearable computing device (e.g., glasses, watch, earpiece), and/or other computing device. The computing device 105 includes memory for storage of data and software applications, a processor for accessing data and executing applications, and components that facilitate communication over a communication network 101. In some implementations, the computing device 105 may include hardware that shares one or more characteristics with the example computer system that is illustrated in FIG. 4. In some implementations, the one or more applications executed by the computing device 105 may include a task application 110. As discussed herein, the computing device 105 may optionally be utilized to, directly or indirectly, identify one or more actions of a user and provide user task information and/or additional information to one or more components. The task application 110 may be utilized to access one or more applications such as, for example, e-mail applications and/or calendar applications. In some implementations, task application 110 may be an add-on to one or more other applications that are executing on computing device 105. In some implementations, task application 110 may be an application that performs one or more actions in addition to identifying task information. For example, task application 110 may be a web browser and additionally provide one or more components with task information based on browser input by a user. Additionally or alternatively, task application 110 may be an application that is dedicated to creating tasks. For example, a user may intend to create a task and the user may utilize task application 110 to submit information to create the intended task.

In some implementations, task database 125 may be utilized by one or more components to store and/or access tasks. The task database 125 may include one or more storage mediums. For example, in some implementations, the task database 125 may include multiple computer servers each containing one or more storage mediums. Information discussed herein may optionally be stored in the task database 125 and/or an additional database. For example, tasks and associated information (e.g., actions, entities, unique entity identifiers, textual representations of associated information, task completion steps, etc.) may be stored in task database 125 for later access by one or more components. In this specification, the term "database" will be used broadly to refer to any collection of data. The data of the database does not need to be structured in any particular way, or structured at all, and it can be stored on storage devices in one or more locations. Thus, for example, the database may include multiple collections of data, each of which may be organized and accessed differently.

In some implementations, one or more of the tasks that are stored in task database 125 may be determined by task recognition engine 115 based on information that is received from task application 110. For example, task application 110 may identify information and/or one or more actions of a user and transmit the information to task recognition engine 115. Task recognition engine 115 may create a task based on the actions of the user and/or other information that was received from task application 110.

In some implementations, task database 125 may include tasks that are associated with users. For example, task recognition engine 115 may determine a task for a user and further determine one or more conditions that may be satisfied to provide the task completion steps of the task to the user. The task may be stored in the task database 125 and retrieved by one or more components to provide to the user when the associated conditions have been satisfied. In some implementations, task database 125 may include tasks that have been previously determined for users and stored without an association to a particular user. For example, task recognition engine 115 may store one or more tasks in task database 125 after a task has been provided to a user for later utilization by one or more components. In some implementations, tasks in task database 125 may be from multiple users. For example, task database 125 may be a repository for tasks that have been identified from information from multiple task applications 110. In some implementations, the identified tasks may be from one user. For example, each user may have a separate task database 125 that includes only tasks associated with that user. In some implementations, the tasks of each user may be stored on the same media and/or in the same database and the tasks of a given user may be accessible only to components of the system for that user. For example, each user may have an instantiation of a task similarity engine 120 and the task similarity engine 120 for a user may have access only to tasks in the task database 125 that have been previously submitted by that user.

In some implementations, one or more components of a task may be associated with an entity. Entity database 130 may be utilized to identify entities that are associated with, for example, task actions, task objects, completion actions, and/or completion objects of tasks. For example, entity database 130 may include a mapping (e.g., data defining an association) between entities and one or more properties and/or other entities related to the entity. In some implementations, entities are topics of discourse. In some implementations, entities are persons, places, concepts, and/or things that can be referred to by a textual representation (e.g., a term or phrase) and are distinguishable from one another (e.g., based on context). For example, the text "bill" in a query or on a webpage may potentially refer to multiple entities such as President Bill Clinton, actor Bill Paxton, an invoice from a business, and a feature of a duck. In some implementations, an entity may be referenced by a unique entity identifier that may be used to identify the entity. The unique entity identifier may be associated with one or more properties associated with the entity and/or with other entities. For example, in some implementations, the entity database 130 may include properties associated with unique identifiers of one or more entities. For example, a unique identifier for the entity associated with the airport with an airport code "LAX" may be associated with a name or alias property of "LAX," another alias property of "Los Angeles International Airport" (an alternative name by which LAX is often referenced), a phone number property, an address property, and/or an entity type property of "airport" in the entity properties database. Additional and/or alternative properties may be associated with an entity in one or more databases.

Task recognition engine 115 may receive task information and/or additional information from task application 110 and/or one or more databases to determine a task to associate with a user. Task information and/or additional information may include, for example, actions of a user and documents that are associated with the user. Task recognition engine 115 may determine one or more task completion steps to associate with a task based on the task information and/or the additional information. In some implementations, task recognition engine 115 may determine one or more tasks and/or task completion steps for a task based on one or more entities in entity database 130. For example, a user may submit the query "cable phone number" to a task application 110 and task recognition engine 115 may determine that the task is "call cable company" based on identifying an entity for the action "call" that is associated with an entity with an alias of "phone number."

In some instances, task recognition engine 115 may be unable to determine a task completion step for a determined task and/or may be unable to determine with a high enough degree of certainty that a task completion step should be associated with the determined task. For example, task recognition engine 115 may not locate a task in task database 125 that matches the determined task. For example, task recognition engine 115 may determine that a task is "buy rhubarb" and look for a task in task database 125 that matches the task. If one or more components have not previously been presented with the task "buy rhubarb," task recognition engine 115 may not find an associated task completion step that has been previously provided.

In some instances, a task may have multiple task completion steps that are not currently associated with the task. For example, a task objective may be "contact cable company" and task recognition engine 115 may determine a task completion step of "call 555-5555" based on a task of "contact cable company" that is identified in task database 125. However, additional task completion steps that may be performed to complete the task, such as "navigate to www-.webpage.com," may not be associated with the identified task in the task database 125.

Task similarity engine 120 receives tasks from task recognition engine 115 and/or identifies one or more tasks in task database 125, and determines whether additional task completion steps may be associated with one or more of the tasks based on similarities between the identified tasks. Multiple received and/or identified tasks may have similar or identical task completion steps. For example, a task to "purchase bananas" and a task to "purchase apples" may be performed at the same location (e.g., a grocery store). Based on similarities between tasks, a task that has not been associated with a task completion step may be associated with a similar task completion step of a similar task. In some implementations, task recognition engine 115 may provide a task to task similarity engine 120 when a task completion step has not been determined for the task. In some implementations, task recognition engine 115 may additionally or alternatively submit tasks that have associated task completion steps. For example, task recognition engine 115 may submit all determined tasks to task similarity engine 120 to determine whether additional task completion steps that were not determined by task recognition engine 115 may be associated with the tasks.

For a given task, task similarity engine 120 identifies one or more tasks that are similar to the given task. The given task may be, for example, a task that was provided to the task similarity engine 120 by the task recognition engine 115, a task that was retrieved from task database 125, and/or a task that was received from one or more alternate components. Similarities between tasks may be determined based on, for example, similarity of task actions of tasks, task objects of tasks, similarities between associated task completion steps of tasks, and/or textual representations of one or more components of tasks.

In some implementations, task similarity engine 120 may determine one or more similarity measurements that are representative of the similarity of corresponding components of two or more tasks. For example, task similarity engine 120 may determine a similarity measurement between task actions of two tasks, task objects of two tasks, completion actions of two tasks, and/or completion objects of two tasks.

In some implementations, task similarity engine 120 may determine an overall similarity measurement for similarity between two or more tasks. An overall similarity measurement may be an aggregate measurement that includes similarity measurements of one or more components of given tasks. For example, for two given tasks, task similarity engine 120 may determine a similarity measurement between the task actions of two tasks, determine a similarity measurement between the task objects of the tasks, and determine an overall similarity measurement for the similarity of the tasks based on the task action similarity measurement and the task object similarity measurement. Task similarity engine 120 may determine that two tasks are similar if the similarity measurement between tasks exceeds a threshold similarity measurement. In some implementations, an overall similarity measurement may be calculated based on similarity measurements between task actions of tasks, task objects of tasks, completion actions of tasks, and/or completion objects of tasks.

Referring to FIGS. 3A through 3D, example tasks and comparisons between tasks that may be performed by task similarity engine 120 are provided. For each task, a task objective is depicted in a gray bold box and task completion steps are provided in the boxes below the task objective. For example, task 300 includes a task objective of "Buy apples" and has an associated task completion step of "Travel to the grocery store." For purposes of illustration, task objectives and task completion steps are depicted as a complete sequence of terms. However, a task objective may include a task action and a task object that may be treated separately for comparison purposes. For example, task 300 includes a task action of "Buy" and a task object of "Apples." Additionally, a task completion step may include a completion action and one or more completion objects that may be treated separately. For example, task 300 includes a task completion step of "Travel to the grocery store" that may be represented by a completion action of "Travel" and a completion object of "Grocery store."

In each example, lines denoted with S references (S1, S2, etc.) represent similarity measurements that may be determined by task similarity engine 120. The similarity measurements may be based on one or more similarity measurements as described herein and/or alternate similarity measurements. For example, S1 denotes a similarity measurement between the task objective of task 300 and the task objective of task 310. Also, for example, S2 denotes a similarity measurement between the task completion steps of "Travel to the grocery store" of task 300 and "Travel to the grocery store" of task 310. For each depicted similarity measurement, the measurement may be based on comparisons between actions and/or entities of the task objective or task completion step. For example, S1 may be a similarity measurement between the task actions of task 300 and task 310 (i.e., "Buy" and "Buy"), the task objects of task 300 and task 310 (i.e., "Apples" and "Bananas"), or a combination of the similarity measurements between the task actions and task objects of the tasks. A task completion step of "?" indicates that a task completion step has not been determined for that task, such as the task completion step of task 330 in FIG. 3B.

In some implementations, one or more similarity measurements may be weighted differently in determining a similarity measurement between two or more tasks. For example, task similarity engine 120 may utilize the following equation to determine an overall similarity measurement between two tasks based on similarity measurements of task components of the two tasks:

$$S_{TA}*W_{TA}+S_{TO}*W_{TO}+S_{CA}*W_{CA}+S_{CO}*W_{CO}=S_{OVERALL}$$

where:
$S_{TA}$=Similarity between task actions of two tasks,
$S_{TO}$=Similarity between task objects of two tasks,
$S_{CA}$=Similarity between completion actions of two tasks,
$S_{CO}$=Similarity between completion objects of two tasks, $S_{OVERALL}$=Similarity between two tasks,
$W_{TA}$=Weight of similarity measurement $S_{TA}$,
$W_{TO}$=Weight of similarity measurement $S_{TO}$,
$W_{CA}$=Weight of similarity measurement $S_{CA}$,
$W_{CO}$=Weight of similarity measurement $S_{CO}$, and
$W_{TA}+W_{TO}+W_{CA}+W_{CO}=1$.

Figure 3A:
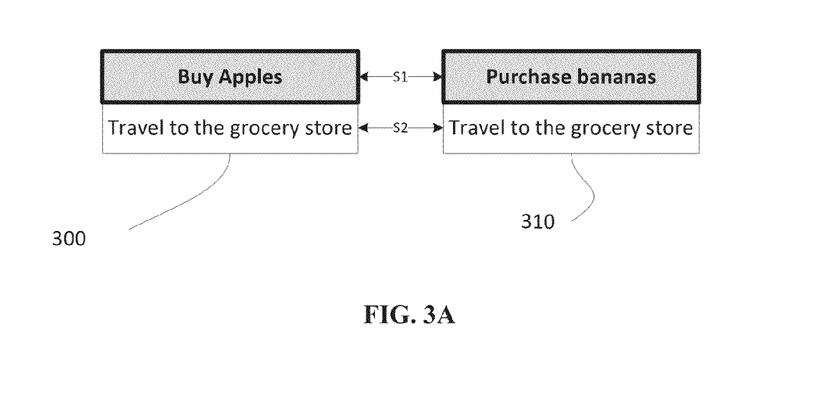
FIGS. 3A, 3B, 3C, and 3D are example illustrations of task similarity comparisons.

For example, referring to FIG. 3A, task similarity engine 120 may determine an overall similarity measurement $S_{OVERALL}$ by determining S1 and S2, where S1 may be a similarity measurement between task actions and/or task objects of the task objectives of task 300 and task 310 (i.e., $S_{TA}$ and/or $S_{TE}$), and where S2 may be a similarity measurement between completion actions and/or completion objects of the task completion steps of task 300 and task 310 (i.e., $S_{CA}$ and/or $S_{CE}$). The similarity measurements may be weighted such that, for example, S1 contributes 80% of the overall similarity measurement and S2 contributes 20% of the similarity measurement. For example, the overall similarity measurement for the tasks of FIG. 3A may be:

$$(S_{TA}+S_{TE})*0.8+(S_{CA}+S_{CE})*0.2=S_{OVERALL}$$

In some implementations, an overall similarity measurement may be determined by weighting similarity measurements evenly. For example, the previous equation for $S_{OVERALL}$ may be utilized such that:

$$W_{TA}=W_{TE}=W_{CA}=W_{CE}=0.25.$$

In some implementations, task similarity engine 120 may determine that two tasks are similar if an overall similarity measurement between the tasks satisfies a threshold. For example, referring to the previous equation for $S_{OVERALL}$, task similarity engine 120 may determine that two tasks are sufficiently similar if:

$$S_{OVERALL} \geq S_{THRESHOLD},$$

where $S_{THRESHOLD}$ is a threshold similarity value that must be satisfied for tasks to be included in a task group.

In some implementations, a similarity measurement between tasks may be based on textual representations of corresponding components between the tasks. For example, task similarity engine 120 may determine a similarity measurement for two given tasks in part by comparing the similarity of the textual representations of task actions of the tasks. Similarity of textual representations may be determined based on, for example, edit distance, identical terms, identification of synonyms in textual representations, comparison of canonicalized textual representations, and/or one or more additional methods of comparing terms for similarity. For example, referring to FIG. 3A, S1 may be determined based on comparing one or more terms of "Buy apples" and "Purchase bananas" for textual similarities. Also, for example, referring to FIG. 3B, S3 may be determined based on comparing the task action of task 320, "Buy," with the task action of task 330, "Buy." Based on the similarity of the two task actions, task similarity engine 120 may assign a value to S3 that is indicative of a similarity between the task actions.

In some implementations, components of tasks may be compared based on relationships between entities of the tasks. For example, an overall similarity measurement for two tasks may be determined based, in part, on identifying a relationship between entities that represent the same type of component in two tasks. For example, similarity measurement S1 may be determined in part based on similarity between the task object "Apples" of task 300 and the task object "Bananas" of task 310. Task similarity engine 120 may determine a similarity measurement for the relationship and utilize the determined measurement to determine an overall similarity measurement for the two tasks. For example, S2 may be determined based on an entity relationship between the task object "Apples" of task 300 and "Bananas" of task 310, and an overall similarity measurement may be determined based on S1 and S2.

In some implementations, determining similarity between tasks may include comparing task actions of two or more tasks. For example, two tasks may be similar if the tasks share a similar task action. In some implementations, textual representations of task actions may be utilized to determine similarity. For example, referring to FIG. 3B, S3 may be determined based on, in part, similarity between the task action of task 320, "buy," and the task action of task 330, "buy." In some implementations, task actions of tasks may be compared based on entities and/or aliases of entities that are associated with a task action of a task. For example, referring to FIG. 3A, S1 may be determined based on identifying that an entity that is associated with the task action "buy," the task action of task 300, is additionally associated with an alias "purchase," the task action of task 310. Task recognition engine 115 may determine relationships between entities based on one or more entities from entity database 130.

In some implementations, determining similarity between tasks may include comparing task objects of two or more tasks. Two tasks may be similar if the task objects of the tasks share one or more characteristics. For example, referring to FIG. 3A, the task object of task 300 is "apples" and the task object of task 310 is "bananas." Task similarity engine 120 may identify entities for "apples" and "bananas" in entity database 130 and determine that the two entities are both members of a "fruit" category and/or are both associated with an entity of "fruit." In some implementations, a similarity measurement may be determined based on the entity association of the tasks. For example, S1 of FIG. 3A may be determined by task similarity engine 120 based on similarity between "apples" and "bananas" that is determined based on an identified association (e.g., both are fruits) between entities that are associated with "apples" and "bananas."

In some implementations, determining a similarity measurement between tasks may include comparing completion actions of two or more tasks. For example, referring to FIG. 3C, both task 350 and task 360 have a completion action of "travel." Based on the task actions of "travel" in both tasks, task similarity engine 120 may assign a similarity measurement S6 that is indicative of a strong similarity between the task actions. Also, for example, S6 may be indicative of an exact textual match between the task actions of task 350 and task 360. In some implementations, entities associated with the task completion actions may be identified in an entity database 130 and S6 may be determined based on one or more associations between the identified entities. For example, a completion action of "travel" and a completion action of "go to" may both be associated with the same entity and/or related to similar entities in entity database 130; and task similarity engine 120 may determine a similarity measurement between the tasks that is partially based on the actions being associated with the same identified entity.

In some implementations, determining a similarity measurement between tasks may include identifying whether two or more tasks include entities that are members of the same or similar categories. For example, referring to FIG. 3D, task 370 includes a completion object of "cell phone provider" and task 380 includes the completion object "Restaurant 1." Task similarity engine 120 may determine similarity measurement S8 based on identifying an entity that is associated with "cell phone provider" and an entity that is associated with "Restaurant 1" and determining that both completion objects are associated with entities that are members of a "business" category. In some implementations, task similarity engine 120 may determine S8 based on both associated entities being members of the "business" category.

In some implementations, task similarity engine 120 may identify multiple categories and/or multiple entities that are associated with entities of two or more tasks and may determine similarity measurements between tasks based on the multiple categories that are associated with the entities of tasks. For example, referring to FIG. 3D, task similarity engine 120 may identify entities associated with the task objects "cell phone provider" and "Restaurant 1," identify that both identified entities are members of a "business" category, and then further identify that "Restaurant 1" is associated with an entity that is a member of a "restaurant" entity category and that "cell phone provider" is associated with an entity that is a member of a "service provider" category. Task similarity engine 120 may determine the similarity of the entities based on both category associations. Because the task objects are both members of the same category ("business") and both members of separate categories ("restaurant" and "service provider"), task similarity engine 120 may determine a similarity measurement for the tasks that is less indicative of similarity than, for example, two tasks that have task objects that are members of multiple same categories, such as task objects of "Restaurant 1" and "Restaurant 2," which may both be members of a "business" category and both members of a "restaurant" category.

Task similarity engine 120 may associate a task completion step that is associated with one or more tasks to one or more of the tasks that are similar and that are not associated with that task completion step. Similarity between two or more tasks may be determined, for example, based on one or more of the methods described herein, such as similarity of task actions, task objects, completion actions, and/or completion objects. In some implementations, multiple similarity measurements of components of tasks may be aggregated to an overall similarity measurement as described herein.

In some implementations, the task similarity engine 120 may associate multiple tasks into a task group based on each of the multiple tasks having a similarity measurement with respect to one or more of the tasks of the task group that satisfies a threshold similarity value. In some implementations, multiple tasks may be compared to one group task of the task group, and the similarity measurement of each of the multiple tasks that satisfies a threshold similarity value with respect to the group task may be included in the task group that includes the group task. For example, referring to FIG. 3B, task 320 may be included in a task group that includes task 330 if S3 satisfies a threshold similarity value. Also, for example, task 340 may be included in the task group that includes task 320 and task 330 if S4 satisfies a threshold similarity measurement. In some implementations, multiple similarity measurements between tasks may be utilized to determine whether the compared tasks are sufficiently similar to be a task group. For example, referring to FIG. 3B, task 320 may additionally be compared to task 340 and the three illustrated tasks may be grouped into a task group based on all similarity measurements between the tasks satisfying a threshold similarity measurement.

In some implementations, a task group may be determined based on a similarity measurement between each of the tasks of the task group and a task template. A task template is a task pattern that generically describes one or more components of tasks. For example, a task template may be "<purchase><fruit>," which includes a generic task action that may be associated with an entities of "buy," "purchase,"
and "procure," and a generic task object that is associated with entities that are member of an entity category of "fruit," which may include task objects of "apples," "oranges," and "bananas." Task similarity engine 120 may determine a template similarity measurement between each of the plurality of tasks and the task template and determine a task group that includes the tasks of the plurality of tasks that have a template similarity measurement that is indicative of the task conforming to the task template.

Many other configurations are possible having more or less components than the environment shown in FIG. 1. For example, although the components are each illustrated alone in FIG. 1, it is understood that one or more of the computing device 105, task recognition engine 115, task similarity engine 120, task database 125, and/or entity database 130 may be combined in some implementations.

Figure 2:
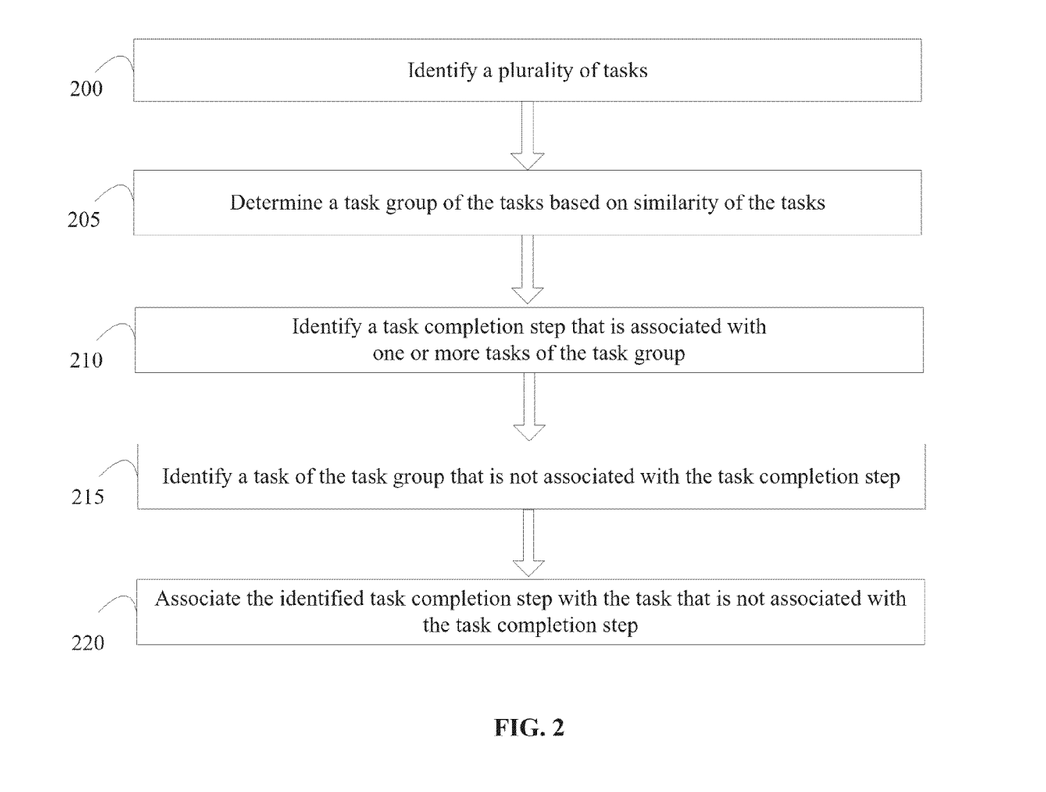
FIG. 2 is a flowchart of a method for determining a task group of tasks that share similarities and associating a task completion step with one of the tasks.

Referring to FIG. 2, a flowchart of a method for determining a task group of tasks that share similarities and associating a task completion step with one of the tasks is provided. Other implementations may perform the steps in a different order, omit certain steps, and/or perform different and/or additional steps than those illustrated in FIG. 2. For convenience, aspects of FIG. 2 will be described with reference to one or more components of FIG. 1 that may perform the method, such as task similarity engine 120 and/or task recognition engine 115.

At step 200, a plurality of tasks is identified. In some implementations, the plurality of tasks is identified by a component that shares one or more characteristics with task similarity engine 120. In some implementations, tasks may be identified from a database that shares one or more characteristics with task database 125. In some implementations, one or more tasks may be provided to task similarity engine 120 by a component that shares one or more characteristics with task recognition engine 115. In some implementations, one or more tasks that are identified may be associated with one or more task completion steps. In some implementations, one or more tasks that are identified may not be associated with a task completion step.

At step 205, a task group is determined based on similarity between the tasks. In some implementations, task similarity between two or more tasks may be determined based on similarity of one or more components of a task objective of the tasks. For example, task similarity may be determined based on task actions and/or task objects as described herein. In some implementations, task similarity may be based on similarity between one or more components of task completion steps that are associated with two or more tasks. For example, similarity between two tasks may be based on similarity between completion actions and/or completion objects of two or more tasks as described herein. In some implementations, similarity between tasks may be determined based on a combination of two or more similarity measurements. For example, overall similarity between two or more tasks may be based on similarity between both task objects and completion objects of the two or more tasks.

At step 210, a task completion step that is associated with one or more of the tasks of the task group is identified. In some implementations, the task completion step may have been previously determined by a component that shares one or more characteristics with task recognition engine 115. For example, task recognition engine 115 may determine a task and associate a task completion step with the task based on information that is received from task application 110. In some implementations, task similarity engine 120 may have previously associated a task completion step with the task utilizing a method that may share one or more characteristics with the method that is provided in FIG. 2. For example, task recognition engine 115 may provide a task to task similarity engine 120 to determine task completion steps to associate with the task utilizing the method of FIG. 2 and store the task in task database 125, and task similarity engine 120 may later receive an additional task from task recognition engine 115 identify the previous task in task database 125, associate one or more additional task completion steps with the task based on the task that is received from task recognition engine 115.

Task similarity engine 120 may determine the task completion step to associate with one of the tasks of the task group. In some implementations, task similarity engine 120 may determine whether to associate a given task completion step with a task of the task group based on the number of tasks and/or percentage of tasks of the task group that are associated with the task completion step. For example, referring to FIG. 3B, task similarity engine 120 may determine that the identified tasks 320 and 340 are associated with the task completion step "Travel to the grocery store" and associate the task completion step with task 330 based on all of the tasks of the task group being associated with the task completion step "Travel to the grocery store." Also, for example, task similarity engine 120 may identify a fourth task of "Buy pumpkins" of the task group and that is associated with the task completion step "Go to the farmer's market." Task similarity engine 120 may not associate the task completion step "Go to the farmer's market" with task 330 if that task completion step does not appear a threshold number of times in the identified tasks of the task group.

In some implementations, task similarity engine 120 may associate a task completion step with a task of the task group for a particular user based on additional information that is associated with the user. For example, a user may be associated with a location where the user lives, information about one or more habits and/or preferences of the user, and/or other information about the user. One or more task completion steps may be associated with a task of a user based on, for example, the likelihood that a user that is associated with the identified information has interest in utilizing the identified task completion step. For example, a task completion step of "Travel to Grocery Store 1" may be associated with a task of a user if the user is located within a threshold distance of "Grocery Store 1."

At step 215, a task of the task group that is not associated with the task completion step that was identified at step 210 is determined. The task may be determined by a component that shares one or more characteristics with task similarity engine 120. In some implementations, the determined task may not be associated with a task completion step. In some implementations, the determined task may be associated with one or more task completion steps, but not the task completion step that was identified in step 210.

At step 220, the task that was identified at step 215 is associated with the task completion step that was identified at step 210. The task may be associated with the task completion step by storing the association between the task and the task completion step in a database that shares one or more characteristics with task database 125. For example, task similarity engine 120 may store a memory address and/or a pointer with a task entry in task database 125 that is associated with and/or points to an entry in the task database 125 for the task completion step. In some implementations, the task completion step may be provided to task recognition engine 115, which may provide the task completion step to a user at the appropriate time as a suggested completion step for the task that was identified at step 210.

Referring to FIG. 3A, an example comparison of two tasks is provided. Task 300 includes a task of "buy apples" and a task completion step of "travel to the grocery store." Task 310 includes a task of "Purchase bananas" and a task completion step of "travel to the grocery store." In some implementations, task similarity engine 120 may identify the task actions of the tasks, "buy" and "purchase," and identify entities in entity database 130 that are associated with the task actions. Task similarity engine 120 may further determine that both task actions are associated with the same entity and/or entities that are members of the same category, and assign a value to the similarity measurement of the task similarity, S1, based on both actions being associated with the same entity and/or related entities. Additionally or alternatively, task similarity engine 120 may compare similarity between the task objects of task 300 and task 310 and assign a value to S1 and/or adjusted assign value to S1 based on similarities between the task objects of "apples" and "bananas." For example, task similarity engine 120 may identify an entity associated with "apples" and an entity that is associated with "bananas," and identify a category to which both identified entities are members, such as a "fruit" category. Based on determining that "apples" and "bananas" are members of the same category, S1 may be assigned a value indicative of a likelihood that task 300 and task 310 are related. For example, task similarity engine 120 may determine, based on comparing task components of task 300 and task 310, that there is an 80% likelihood that task 300 and task 310 are similar, and assign S1 the value of 0.8.

In the tasks of FIG. 3A, both task completion steps are "travel to the grocery store." Task similarity engine 120 may identify the task completion step of each of the tasks and assign a value S2 that is indicative of the likelihood that task 300 and task 310 are related. For example, task similarity engine 120 may determine that there is 100% similarity between the task completion steps of task 300 and task 310, and S2 may be assigned a value of 1.0 based on the identical task completion steps for both tasks.

In some implementations of the example tasks of FIG. 3A, task similarity engine 120 may aggregate similarity measurements S1 and S2 into one overall similarity measurement and determine the overall similarity of task 300 and task 310 based on the determined overall similarity measurement. Task similarity engine 120 may determine that, based on the values of S1 and S2, an overall similarity measurement for similarity between task 300 and task 310 that is an average of S1 and S2, or 0.9. In some implementations, S1 and S2 may not be weighted evenly as described herein.

Figure 3B:
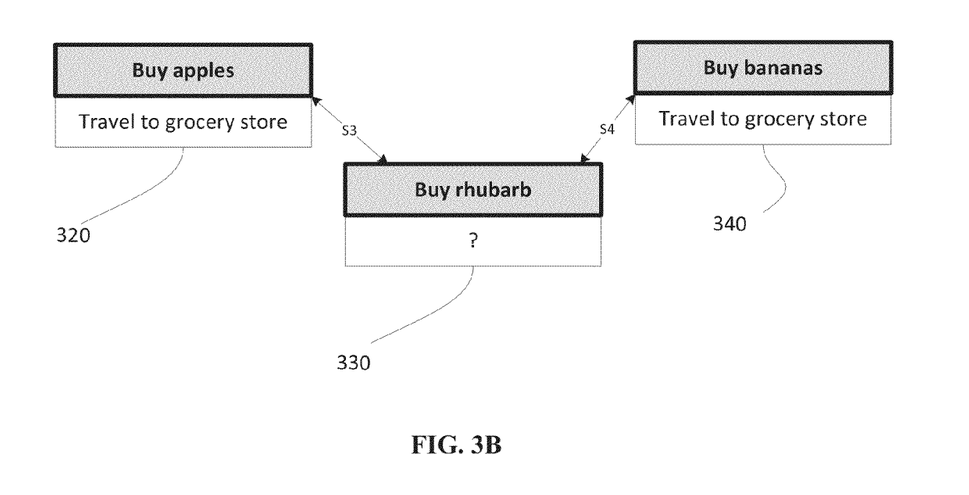

Referring to FIG. 3B, an example of determining a task completion step for a task that does not have an assigned task completion step is illustrated. Task 330 may be a task that has been received from task recognition engine 115, which does not have an associated task completion step. Task similarity engine 120 may identify task 320 from task database 125 and compare task 320 with task 330 to determine whether the similarity between the tasks satisfies a threshold similarity measurement. In the provided example, both tasks share the same task action, "buy." Additionally, both task objects are members of the same category of "fruit." A user may not have previously submitted the task "buy rhubarb" and/or task recognition engine 115 may not have previously determined a task completion step for "buy rhubarb," so the task may not have an associated task completion step. Task similarity engine 120 may determine a value for S3 that is indicative of similarity between the task actions and/or task objects of task 320 and task 330 and determine that the similarity between the tasks satisfies a threshold similarity measurement. Based on the threshold similarity of the tasks, task similarity engine 120 may assign the task completion step of "Travel to the grocery store" to task 330 based on determining that it is likely that the tasks will have the same task completion step. Also, for example, task similarity engine 120 may additionally identify task 340 and also assign a similarity measurement between task 340 and task 330 that is indicative of similarity between task 340 and task 330. Task similarity engine 120 may determine that, based on multiple tasks sharing the same task completion step and having similar task actions, task 330 is likely to be completed utilizing the same task completion step as the other tasks. Task similarity engine 120 may associate the task completion step "Travel to the grocery store" to task 330 based on the similarity measurements.

Figure 3C:
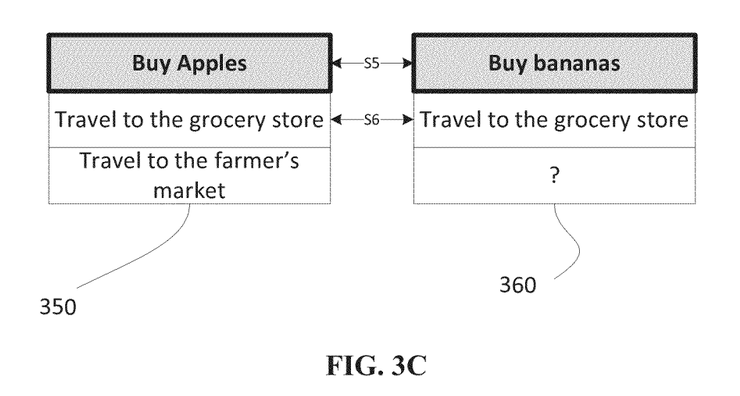

Referring to FIG. 3C, another example of comparing tasks and determining whether to assign a task completion step to a task based on similarities with another task is illustrated. In the illustrated example, task 350 may be a task that is identified from task database 125 and task 360 may be a task that is received from task recognition engine 115. Task similarity engine 120 may determine similarity measurements for similarity between the tasks actions and/or task objects of task 350 and task 360, as described herein, and assign a similarity measurement S5. Additionally, task similarity engine 120 may identify that both tasks share a common task completion step, "Travel to the grocery store," as described herein, and assign a similarity measurement S6 that is indicative of sharing a task completion step. Task similarity engine 120 may determine an overall similarity measurement for the tasks based on S5 and S6, and if task similarity engine 120 determines that the overall similarity measurement between the tasks satisfies a threshold, the additional task completion step of task 350, "travel to the farmer's market," may be associated with task 360.

Figure 3D:
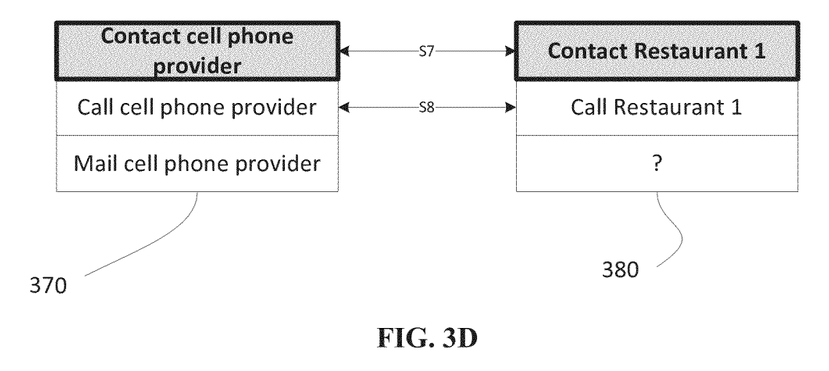

Referring to FIG. 3D, another example of comparing tasks and determining whether to assign a task completion to a task based on similarities with another task is provided. In the illustrated example, both task 370 and task 380 include the same task action, "Contact," and both include task objects that may be identified from entity database 130 as members of an entity category "businesses." Additionally, both tasks include the task completion step with a completion action of "Call" and S8 may be determined based on the completion actions. In some implementations, task similarity engine 120 may assign a value S7 that is indicative of similarity between the task objectives of task 370 and task 380 and associate the task completion step of "Mail cell phone provider" to task 380, as described herein. Also, for example, task similarity engine 120 may associate a task completion step with task 280 that includes the same completion action as "Mail cell phone provider" but additionally substitutes the completion object of the associated task completion step with the task object of task 380, which would make the associated task completion step "Mail Restaurant 1." In some implementations, task similarity engine 120 may identify multiple categories to which the task objects of task 370 and task 380 belong, and assign a value to S7 that is based on the associations of the task objects with multiple identified categories. For example, task similarity engine 120 may determine that "cell phone provider" of task 370 is also a member of the entity category "service provider" and "Restaurant 1" of task 380 is a member of the entity category "restaurant," and S7 may be less indicative of similarity between the tasks than tasks where the task objects have multiple categories in common. Tasks that include entities that share multiple entity categories may be assigned a similarity value that is more indicative of similarity than tasks with entities that share fewer entity categories.

In some implementations, the methods described herein may be performed substantially in real time. For example, task application 110 may provide information to task recognition engine 115, task recognition engine 115 may determine a task based on the information, provide the task to task similarity engine 120, and task similarity engine 120 may provide task recognition engine 115 with additional task completion steps for the task, which may be provided to the user at the appropriate time based on fulfillment of one or more conditions. Also, for example, task similarity engine 120 may determine task completion steps for a task when task recognition engine 115 initially provides the task to the task similarity engine 120 and store the task and task completion steps in task database 125 for later access by task recognition engine 115 and/or task application 110.

In some implementations, the methods described here may be performed utilizing tasks that have been previously stored in task database 125. For example, task similarity engine 120 may identify two or more tasks from task database 125, determine similarity between the tasks, determine one or more task completion steps to associate with one or more of the tasks, and store the determined task completion step in task database 125.

FIG. 4 is a block diagram of an example computer system 410. Computer system 410 typically includes at least one processor 414 which communicates with a number of peripheral devices via bus subsystem 412. These peripheral devices may include a storage subsystem 424, including, for example, a memory subsystem 426 and a file storage subsystem 428, user interface input devices 422, user interface output devices 420, and a network interface subsystem 416. The input and output devices allow user interaction with computer system 410. Network interface subsystem 416 provides an interface to outside networks and is coupled to corresponding interface devices in other computer systems.

User interface input devices 422 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 410 or onto a communication network.

User interface output devices 420 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 410 to the user or to another machine or computer system.

Storage subsystem 424 stores programming and data constructs that provide the functionality of some or all of the modules described herein. For example, the storage subsystem 424 may include the logic to identify one or more similar tasks and associate a task completion step that is associated with the tasks with a similar task that is not associated with the task completion step.

These software modules are generally executed by processor 414 alone or in combination with other processors. Memory 426 used in the storage subsystem can include a number of memories including a main random access memory (RAM) 430 for storage of instructions and data during program execution and a read only memory (ROM) 432 in which fixed instructions are stored. A file storage subsystem 428 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 428 in the storage subsystem 424, or in other machines accessible by the processor(s) 414.

Bus subsystem 412 provides a mechanism for letting the various components and subsystems of computer system 410 communicate with each other as intended. Although bus subsystem 412 is shown schematically as a single bus, alternative implementations of the bus subsystem may use multiple busses.

Computer system 410 can be of varying types including a workstation, server, computing cluster, blade server, server farm, or any other data processing system or computing device. Due to the ever-changing nature of computers and networks, the description of computer system 410 depicted in FIG. 4 is intended only as a specific example for purposes of illustrating some implementations. Many other configurations of computer system 410 are possible having more or fewer components than the computer system depicted in FIG. 4.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A computer implemented method, comprising:
    identifying a plurality of tasks, wherein one or more of the tasks are identified from one or more databases;
    determining a task group of the tasks based on similarity between tasks of the task group;
    determining an associated task of the tasks of the task group, wherein the associated task is associated with a task completion step;
    identifying an unassociated task of the task group based on the unassociated task being non-associated with the task completion step of the associated task;
    associating the task completion step of the associated task with the unassociated task; and
    storing the association between the unassociated task and the task completion step.

2. The method of claim 1, wherein similarity between the tasks of the task group is determined based on a task similarity measurement between the associated task and the other tasks of the task group.

3. The method of claim 1, wherein similarity between the tasks of the task group is determined based on determining a template similarity measurement for each of the tasks of the task group, wherein the template similarity measurement for a given task is based on conformity between the given task and a task template.

4. The method of claim 1, wherein each of the tasks includes a task objective.

5. The method of claim 4, wherein a given task objective includes a task action and a task object.

6. The method of claim 5, wherein the similarity measurement for a given task of the tasks is based on an action similarity measurement between the task action of the given task and the task action of one or more other tasks of the task group.

7. The method of claim 5, wherein the similarity measurement for a given task of the tasks is based on an object similarity measurement between the task object of the given task and the task object of one or more other tasks of the task group.

8. The method of claim 4, wherein each of the task objectives of the tasks includes a textual representation of the task objective, and wherein the similarity measurement for a given task of the tasks is based on similarity between the textual representation of the given task and the textual representation of one or more of the other tasks of the task group.

9. The method of claim 2, further comprising:
    identifying a second associated task of the tasks of the task group, wherein the second associated task is associated with a second task completion step, wherein the second associated task is unique from the associated task; and
    determining a task completion step similarity measurement, wherein the task completion step similarity measurement is indicative of similarity between the associated task completion step and the second associated task completion step, and wherein the similarity of the second associated task with the tasks of the task group is based on the task completion step similarity measurement.

10. The method of claim 9, wherein the task completion step includes a first completion action and a first completion object, wherein the second task completion step includes a second completion action and a second completion object.

11. The method of claim 10, wherein determining the task completion step similarity measurement includes determining a similarity between the first completion action and the second completion action.

12. The method of claim 10, wherein determining the task completion step similarity measurement includes determining a similarity between the first completion object and the second completion object.

13. The method of claim 1, wherein the unassociated task is received from a remote computing device.

14. The method of claim 13, further comprising providing the task completion step to the remote computing device as a suggested completion step for the unassociated task.

15. A system including memory and one or more processors operable to execute instructions in memory, comprising instructions to:
    identify a plurality of tasks, wherein one or more of the tasks are identified from one or more databases;

determine a task group of the tasks based on similarity between tasks of the task group;
determine an associated task of the tasks of the task group, wherein the associated task is associated with a task completion step;
identify an unassociated task of the task group based on the unassociated task being non-associated with the task completion step of the associated task;
associate the task completion step of the associated task with the unassociated task; and
store the association between the unassociated task and the task completion step.

16. The system of claim 15, wherein similarity between the tasks of the task group is determined based on a task similarity measurement between the associated task and the other tasks of the task group.

17. The system of claim 15, wherein similarity between the tasks of the task group is determined based on determining a template similarity measurement for each of the tasks of the task group, wherein the template similarity measurement for a given task is based on conformity between the given task and a task template.

18. The system of claim 15, wherein each of the tasks includes a task objective.

19. The system of claim 18, wherein a given task objective includes a task action and a task object.

20. The system of claim 19, wherein the similarity measurement for a given task of the tasks is based on an action similarity measurement between the task action of the given task and the task action of one or more other tasks of the task group.

21. The system of claim 19, wherein the similarity measurement for a given task of the tasks is based on an object similarity measurement between the task object of the given task and the task object of one or more other tasks of the task group.

22. The system of claim 16, wherein the instructions further include instructions to:
identify a second associated task of the tasks of the task group, wherein the second associated task is associated with a second task completion step, and wherein the second associated task is unique from the associated task; and
determine a task completion step similarity measurement, wherein the task completion step similarity measurement is indicative of similarity between the associated task completion step and the second associated task completion step, and wherein the similarity of the second associated task with the tasks of the task group is based on the task completion step similarity measurement.

23. The system of claim 22, wherein the task completion step includes a first completion action and a first completion object, wherein the second task completion step includes a second completion action and a second completion object.

24. A non-transitory computer readable storage medium storing at least one program configured for execution by at least one processor of a computer system, the at least one program comprising instructions to:
identify a plurality of tasks, wherein one or more of the tasks are identified from one or more databases;
determine a task group of the tasks based on similarity between tasks of the task group;
determine an associated task of the tasks of the task group, wherein the associated task is associated with a task completion step;
identify an unassociated task of the task group based on the unassociated task being non-associated with the task completion step of the associated task;
associate the task completion step of the associated task with the unassociated task; and
store the association between the unassociated task and the task completion step.

\* \* \* \* \*